(12) United States Patent
Masters et al.

(10) Patent No.: US 8,579,546 B2
(45) Date of Patent: Nov. 12, 2013

(54) APPARATUS AND METHOD FOR INHIBITING VORTEX-INDUCED VIBRATION

(75) Inventors: Rodney H. Masters, Houston, TX (US); Billy L. Griffith, Houston, TX (US)

(73) Assignee: VIV Supression, Inc., Houston, TX (US)

( * ) Notice: Subject to any disclaimer, the term of this patent is extended or adjusted under 35 U.S.C. 154(b) by 463 days.

(21) Appl. No.: 12/016,417

(22) Filed: Jan. 18, 2008

(65) Prior Publication Data

US 2009/0185868 A1 Jul. 23, 2009

(51) Int. Cl.
*F15D 1/00* (2006.01)
(52) U.S. Cl.
USPC .......................................................... 405/216
(58) Field of Classification Search
USPC ................... 405/211, 211.2, 212–216, 211.1; 114/243; 166/350, 367
See application file for complete search history.

(56) References Cited

U.S. PATENT DOCUMENTS

| | | | |
|---|---|---|---|
| 4,474,129 A * | 10/1984 | Watkins et al. | 114/243 |
| 4,612,056 A * | 9/1986 | Gibson | 134/6 |
| 6,019,549 A | 2/2000 | Blair et al. | |
| 6,048,136 A | 4/2000 | Denison et al. | |
| 6,347,911 B1 | 2/2002 | Blair et al. | |
| 6,390,725 B1 | 5/2002 | Masters | |
| 6,401,646 B1 * | 6/2002 | Masters et al. | 114/243 |
| 6,412,562 B1 * | 7/2002 | Shaw | 166/335 |
| 6,561,734 B1 | 5/2003 | Allen et al. | |
| 6,565,287 B2 | 5/2003 | McMillan et al. | |
| 6,695,540 B1 | 2/2004 | Taquino | |
| 6,896,447 B1 | 5/2005 | Taquino | |
| 6,908,063 B2 | 6/2005 | Bearman et al. | |
| 6,953,308 B1 | 10/2005 | Horton | |
| 7,070,361 B2 | 7/2006 | McMillan et al. | |
| 2007/0231077 A1 | 10/2007 | Burgess | |

FOREIGN PATENT DOCUMENTS

| | | | |
|---|---|---|---|
| GB | 2335248 | * | 9/1999 |
| WO | WO0061433 | * | 10/2000 |
| WO | WO0177563 | * | 10/2001 |
| WO | WO 2005024247 A1 | * | 3/2005 |
| WO | WO 2007103707 A2 | * | 9/2007 |

OTHER PUBLICATIONS

International Searching Authority, "Notification of Transmittal of the International Search Report and the Written Opinion of the International Searching Authority, or the Declaration," PCT2009/031541 mailed Jun. 24, 2009.

* cited by examiner

*Primary Examiner* — Sunil Singh
(74) *Attorney, Agent, or Firm* — Edmonds & Nolte, P.C.

(57) ABSTRACT

Apparatus and methods for reducing vortex induced vibration are provided. An apparatus for reducing vortex induced vibration can include a first body at least partially disposed within a second body. The first body can be made of a material having more weight per linear foot than the second body. The apparatus can also include one or more helical fins.

32 Claims, 3 Drawing Sheets

APPARATUS AND METHOD FOR INHIBITING VORTEX-INDUCED VIBRATION

BACKGROUND OF THE INVENTION

1. Field of the Invention

Embodiments of the present invention generally relate to systems and methods for reducing vortex-induced-vibrations on offshore equipment. More particularly, embodiments relate to apparatus and methods for reducing vortex-induced-vibrations on marine elements for offshore hydrocarbon exploration and production.

2. Description of the Related Art

In off-shore operations, vortex-induced vibration or "VIV" is caused by the flow of water around a tubular, such as a riser or other marine element. The flow of water leads to the shedding of vortices which cause alternating forces on either side of the marine element, thereby causing the element to vibrate. When the frequency of the shedding vortices is at or near the natural frequency of the marine element, resonance occurs. Such resonance can result in potentially destructive levels of vibration that can adversely affect the platform structure itself in addition to the equipment and personnel on the platform.

To counteract VIV, systems to divert or absorb the vibrational energy of the water have been used. Certain traditional systems have included shrouds, fairings, and strakes. Shrouds are the least expensive but also the least effective. Fairings are more expensive, harder to manufacture and more difficult to install. Strakes are satisfactory for diverting vibrational energy and reducing VIV, but the drag acting on the marine element can be increased.

There is a need, therefore, for new apparatus and methods for reducing vortex induced vibration.

SUMMARY OF THE INVENTION

Apparatus and methods for reducing vortex induced vibration are provided. In at least one specific embodiment, the apparatus can include a first body, a second body, and one or more helical fins. The first body can contain or include concrete or metal having more weight per linear foot than the second body, and can be concentrically disposed within the second body.

In at least one specific embodiment, the method for reducing vortex induced vibration can include, but is not limited to, installing an apparatus about a marine element, the apparatus can include, but is not limited to, a first body at least partially disposed within a second body, wherein the first body comprises a material having more weight per linear foot than the second body; and one or more helical fins.

In at least one specific embodiment, the method for making an apparatus for reducing vortex induced vibration can include, but is not limited to, injection molding, insert molding or rotomolding a second body about a first body, wherein the first body is concentrically disposed within the second body and includes a material having more weight per linear foot than the second body; and disposing one or more helical fins on the second body.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
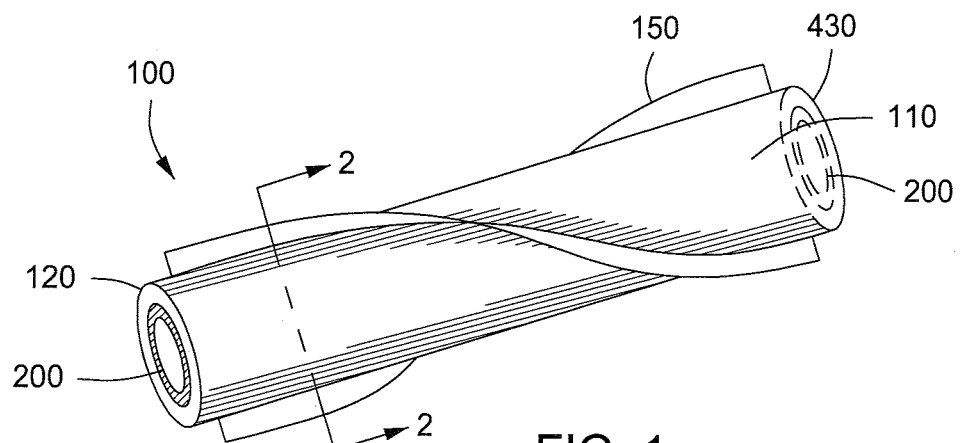
FIG. 1 depicts a schematic of an illustrative apparatus for reducing vortex induced vibration, according to one or more embodiments described.

FIG. 1 depicts a schematic of an illustrative apparatus 100 for reducing vortex induced vibration, according to one or more embodiments described. The apparatus 100 can be a strake having an inner body ("body" or "first body") 200 at least partially disposed within an outer body ("cover" or "second body") 110. The strake 100 can also include one or more fins 150 attached or otherwise disposed on an outer surface or diameter of the cover 110, the inner body 200, or both.

The inner body 200 can be made from a heavy or dense material, such as metal or concrete to add weight to the strake 100. The inner body 200 should have more weight per linear foot than the cover 110. In one or more embodiments, the inner body 200 weighs at least 50%, 100%, 200%, 300%, 400%, or 500% more than the cover 110. In one or more embodiments, the weight of the inner body 200 is 2×, 5×, 10×, 50×, 100×, 500×, or 1000× heavier than the weight (X) of the cover 110. By increasing the weight of the strake 100, drag forces against the strake 100 can be reduced or eliminated. The inner body 200 can be as further described below with reference to FIG. 2.

Figure 2:
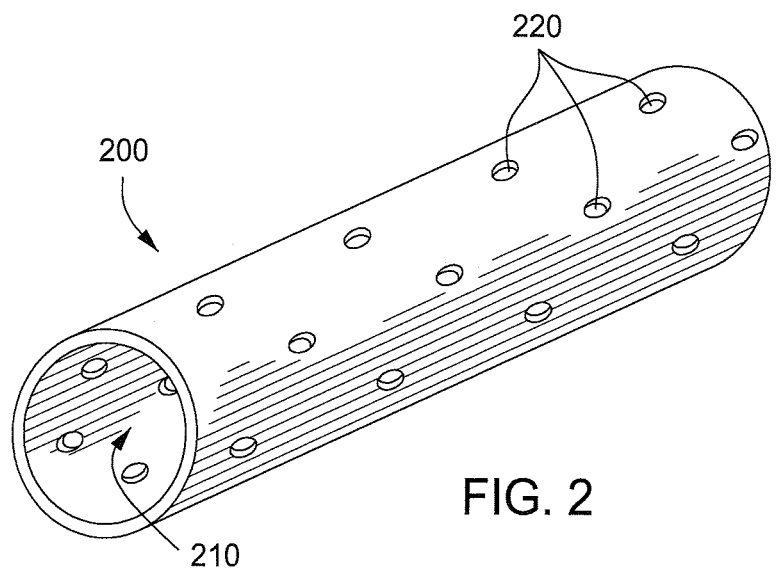
FIG. 2 depicts a schematic of an illustrative first body, according to one or more embodiments described.

FIG. 2 depicts a schematic of an illustrative first body 200, according to one or more embodiments. The inner body 200 can be monolithic or fabricated from two or more pieces or sections. The inner body 200 can be any cross-sectional shape and have any length. For example, the inner body 200 can have a profile or cross-section that is circular, elliptical, polygonal, or oval. Preferably, the inner body 200 has a cross-sectional shape that compliments the outer surface of the marine element to be protected.

The inner body 200 can be annular having a bore or aperture 210 formed therethrough. The bore or aperture 210 formed through the inner body 200 can have any geometric shape and size. For example, the inner body 200 can be a cylindrical or tubular member having a circular bore or aperture 210 formed therethrough.

In one or more embodiments, the diameter of the bore 210 can vary about the length of the inner body 200. The diameter of the bore 210 can also remain constant or substantially constant about the length of the inner body 200. The diameter of the bore 210 can range anywhere of from about 0.1 m (4 in) to about 1.8 m (6 ft). The diameter of the inner body 200 can range anywhere from a low of about 0.05 m (2 in), 0.1 m (4 in), or 0.15 m (6 in) to a high of about 0.6 m (2 ft), 1.2 m (4 ft), or 1.8 m (6 ft).

The length of the inner body 200 can vary. For example, the length of the inner body 200 can range from about 0.3 m (1 ft) to about 6 m (20 ft). In one or more embodiments, the length of the inner body 200 can range from a low of about 0.15 m (0.5 ft), 0.3 m (1 ft), or 0.6 m (2 ft), or 0.9 m (3 ft) to a high of about 1.2 m (4 ft), 1.5 m (5 ft), 1.8 m (6 ft), or 2.4 m (8 ft).

The inner body 200 can also include one or more apertures or holes 220, which can be disposed anywhere about the diameter and/or length of the inner body 200. The holes 220 provide an unobstructed path of communication between the inner surfaces and outer surfaces of the inner body 200. When two or more holes 220 are used, the holes 220 can be arranged randomly or in a predetermined pattern about the inner body 200. The one or more holes 220 can be of any geometrical shape and size.

Although not shown, the inner body 200 can include one or more recesses, depressions, protrusions, and/or textures disposed on the outer and/or inner surfaces thereof. The one or more recesses, depressions, protrusions and/or texturing can be used in combination with or in place of the one or more holes 220. As will be discussed in more detail below, the holes 220, recesses, depressions, protrusions, and/or texturing can improve the adherence/retention of the cover 110 to the inner body 200.

Suitable materials for the inner body 200 can include, but are not limited to, any type of metal, concrete, asphalt, ceramic, or combination thereof. Suitable metallic materials can include, but are not limited to steel, aluminum, steel alloys, stainless steel, stainless steel alloys, aluminum alloys, non-ferrous metals, non-ferrous metal alloys, or combinations thereof. Suitable types of concrete can include, but are not limited to, regular, high-strength, high-performance, self-compacting, shotcrete, pervious, cellular, roller-compacted, air-entrained, ready-mixed, reinforced, or any other type. Suitable types of asphalt can include, but are not limited to, hot mixed, warm mixed, or cold mixed. The material can be chosen based on the desired physical properties of the inner body 200, such as corrosion resistance, density, hardness, ductility, malleability, tensile strength; environmental stresses such as temperature and pressure; as well as economic factors such as cost and availability.

In one or more embodiments, the inner body 200 can be made from one or more resins, polymers, or epoxies, which can be impregnated or otherwise imbedded with one or more pieces or particles of metal, concrete, asphalt, ceramic, rock, or any combination thereof. Suitable types of rock for impregnation can include igneous, metamorphic, or sedimentary rock.

The inner body 200 can be made or otherwise shaped using any suitable method. For example, the inner body 200 can be cast, extruded, pressed, rolled and welded, molded, or otherwise shaped from one or more materials. The inner body 200 can be cast or molded from metal or concrete. In one or more embodiments, the inner body 200 can be fabricated from steel pipes or plates.

As mentioned above, the inner body 200 can be made from any material suitable to increase the weight of the strake 100. The desired weight of the strake 100 can vary depending on the location of the strake 100 on the marine element, i.e. depth of the strake 100 relative to the water level. The desired weight of the strake 100 can also depend on the water flow rates, i.e. current, around the marine element where the strake 100 is located.

In one or more embodiments, the weight of the inner body 200 can range from about 5 pounds (2.27 kg) per linear foot to about 100 pounds (45.36 kg) per linear foot. In one or more embodiments, the inner body 200 can have a weight ranging from a low of about 10 pounds (4.54 kg) per linear foot, 20 pounds (9.07 kg) per linear foot, or 30 pounds (13.61 kg) per linear foot to a high of about 40 pounds (18.14 kg) per linear foot, 50 pounds (22.68 kg) per linear foot, or 60 pounds (27.21 kg) per linear foot.

In one or more embodiments, the inner body 200 can be sized to increase the weight of the strake 100 relative to a strake of similar size, length, wall thickness, and other dimensions, but composed of a material having less density. For example, the inner body 200 can be sized to increase the weight of the strake 100 by at least 50%, 100%, 200%, 300%, 400%, 500%, 600%, or more relative to a strake of the same dimensions, but composed of a material having less density.

In operation, a strake 100 disposed around a marine element increases the cross sectional area of the marine element relative to what the same marine element without the strakes would normally have. This increase in cross sectional area can increase the drag forces exerted by water flowing there around. The increased weight of the strake 100 due to the inner body 200 can counteract the undesirable consequences of the increase of the strake/marine element cross sectional area. More particularly, the increased weight of the strake 100, due to the increased weight per linear foot of the inner body 200, can reduce drag forces exerted on the strake 100 and the marine element it is disposed about (i.e. a drilling or production riser). The decrease in drag forces that otherwise would have been exerted on the strake 100 and marine element yields reduced vibrations, tension, and other undesirable and potentially damaging effects of current flowing against a marine element.

Referring to the cover 110 in more detail, the cover 110 can be applied to at least a portion of the outer surface of the inner body 200, inner surface of the inner body 200, ends of the inner body 200, fins 150, or any combination thereof. The cover 110 can reduce or eliminate the corrosive and damaging environment a strake 100 without the cover 110 would otherwise be exposed to in an marine environment. Preferably, the cover 110 can be applied to the entire outer surface and ends to minimize or otherwise protect the inner body 200 from any harmful condition.

The cover 110 can be made from any suitable material to protect the inner body 200. For example, the cover 110 can be made from a corrosion resistant or anti-corrosive material. The cover 110 can be a coating, such as a paint, paste, lacquer, laminate, wax, gel, glue, epoxy, or resin. The cover 110 can be or include: a thin film made of plastic or other polymeric material; multi-layer fiberglass mat; particulate powder; wire mesh; or screen. Suitable polymeric materials can include, but are not limited to, polyurethane, polyethylene, polypropylene, polytetrafluoroethylene, vinyl ester resin, polyvinyl chloride (PVC), isophthalic polyester resin, phenolic, copolymers thereof, blends thereof, or other polymeric materials with suitable flexibility and mechanical properties.

The cover 110 can be applied by any suitable method. Suitable methods can include, but are not limited to, dip coating, injection molding, compression molding, transfer molding, insert molding, flow coating, dip-spin coating, curtain coating, air knife coating, spraying, fluidized bed dip coating, flame spraying, paint, epoxy, brushing, and any combinations thereof.

The cover 110 can be of any suitable thickness. The thickness of the cover 110 can range from about 0.025 mm (0.001 in) to about 0.1 m (4 in). The thickness of the cover 110 can also range from a low of about 0.025 mm (0.001 in), 0.1 mm (0.004 in), or 1 mm (0.04 in) to about 2.5 cm (1 in), 5 cm (2 in), or 10 cm (4 in).

Figure 3:
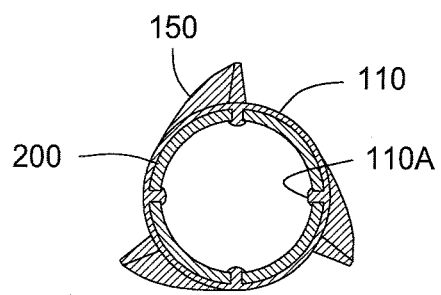
FIG. 3 depicts a schematic cross-sectional view taken along lines 2-2 of FIG. 1.

In one or more embodiments, the cover 110 can be applied to the inner body 200 under conditions sufficient to allow the cover 110 to contact at least a portion of the inner surface of the inner body 200 via the holes 220, thereby more securely attaching the cover 110 to the inner body 200, as shown in FIG. 3. FIG. 3 depicts a schematic cross-sectional view taken along lines 2-2 of FIG. 1 to better illustrate this embodiment. As shown in FIG. 3, the coating 110A can form a "plug" or "dimple" through the one or more holes 220 to contact the inner surface of the inner body 220. Such plug or dimple improves anchors within the holes 220 to provide better adherence/retention of the cover 110 to the inner body 200.

In at least one specific embodiment, a polymeric cover 110 can be applied to the inner body 200 in its molten state and allowed to flow through the holes 220 and contact at least a portion of the inner wall of the inner body 200. Once dried, hardened, and/or cured the polymeric cover 110 can improve the adherence/retention of the cover 110 to the inner body 200.

Referring again to FIG. 1, the strake 100 can include any number of fins 150 disposed thereon. The number of fins 150 disposed on the strake 100 can range from 1 to 200, or from 1 to 150, or from 1 to 100, or from 5 to 60. The one or more fins 150 can be separate components attached or otherwise disposed on the cover 110, the inner body 200, or both. The fins 150 can be integrally formed with the cover 110 (i.e. the one or more fins 150 and the cover 110 can be embodied as a single component). The fins 150 can also be attached or disposed on the inner body 200 and then the cover 110 can be placed or otherwise at least partially disposed thereon.

The one or more fins 150 can be attached or otherwise disposed on the strake 100 by any known method. Suitable methods can include epoxy or other adhesives, fasteners, rivets, screws, nuts and bolts, or welding. The fins 150 can be integrally formed with the cover 110 and/or body 200 by, for example, injection molding, insert molding, or rotomolding techniques. If two or more materials are desired, 2K or 3K injection or insert molding techniques can be used.

The one or more fins 150 can be helically arranged or disposed in any pattern about the strake 100. The one or more fins 150 can be helically arranged or disposed in any pattern having any frequency or pattern of repetition. The one or more fins 150 can extend over the entire length of the strake 100 or any section/portion thereof.

Any two adjacent fins 150 disposed in a particular helical path along the length of the strake 100 can be separated by a gap or space. The gap can be any suitable distance and can vary along the length of the strake 100. Gaps between any two sets of fins 150 disposed on the strake 100 along two separate and independent helical paths along the length of the strake 100 can be positioned at the same point along the length.

Positioning gaps in this manner can provide a space around the entire diameter of the strake 100 where no fins 150 are present. In one or more embodiments, one or more straps (e.g. metal bands) can be placed in the gap around the outer surface of the strake 100 and tightened, thereby securing the strake 100 to the marine element (not shown). Aligned gaps along a diameter of the strake 100 can prevent straps from deforming or otherwise damaging the fins 150 when tightened.

The fins 150 can have a height from about 0.05 D to about 0.5 D. The fins 150 can have a height ranging from a low of about 0.05 D, about 0.1 D, or about 0.15 D to a high of about 0.2 D, 0.25 D, or 0.3 D or more. As used herein "D" refers to the inner diameter of the strake 100.

The inner body 200, the cover 110, and/or the one or more fins 150 can be at least partially made from, include, or have disposed on any surface thereof one or more marine growth inhibitors ("antifouling agents"). Antifouling agents can be applied in any suitable form such as a solid or a liquid. The one or more antifouling agents can be applied as or included within a coating, such as a paint, paste, lacquer, laminate, wax, gel, glue, epoxy, or resin; a solid, such as a foil, bar, rod, particulate powder, or a wire.

Illustrative solid antifouling agents can include copper, zinc, titanium, tin, tantalum, nickel, iron, alloys thereof, oxides thereof, and combinations thereof. Preferred alloys include copper/nickel and copper/beryllium alloys and other alloys known in the art to deter marine life growth.

Illustrative, commercially available coatings or paints include, but are not limited to International Paint's Intersleek 900, Intersleek 700, Micron 66, Micron Extra which are available from International Paints; Trinidad available from Pettit; ABC Release 670 and 671 which are available from PPG; and Flag CopperQuick Antifouling, and Flag Performance Extra Antifouling which are available from Flag Paint and Finishes. An antifouling system known by the trade name Cuprotect can also be used.

Figure 4:
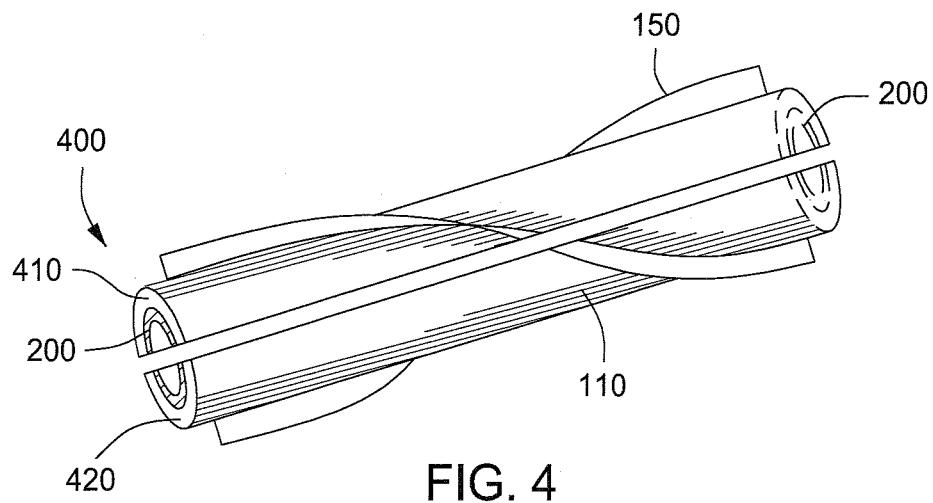
FIG. 4 depicts a schematic of another illustrative apparatus for reducing vortex induced vibration, according to one or more embodiments described.

FIG. 4 depicts a schematic of another illustrative strake 400 for reducing vortex induced vibration, according to one or more embodiments. As described above with reference to the strake 100, the strake 400 can include an inner body 200, cover 110, and fins 150. The strake 400 can be cut in half along its length or the strake 400 can include two or more longitudinal sections 410, 420. The two or more sections 410, 420 can be made for example, by rolling or bending a quadrilateral sheet, cast, extruded, pressed, molded, or otherwise shaped from one or more materials. Each section 410, 420 can include a portion of the inner body 200, cover 110 and fins 150 so that when assembled the sections 410, 420 provide a complete assembly that can be disposed about a marine element. The sections 410, 420 can be attached to one another after assembly using one more straps (e.g. flexible bands), wires, and tie wraps (e.g. stainless steel tie wraps, releaseable tie wraps, ethylene-tetrafluoroethylene fluoropolymer tie wraps, low profile tie wraps).

Figure 5:
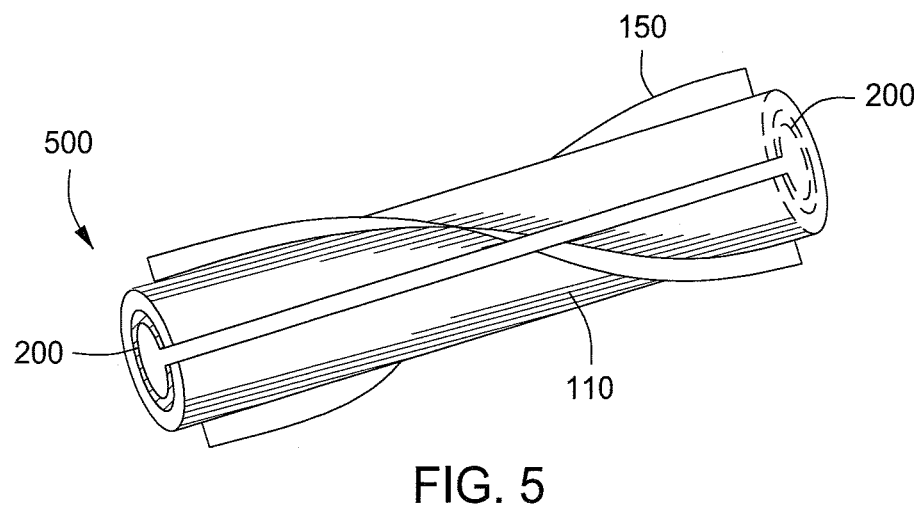
FIG. 5 depicts a schematic of yet another illustrative apparatus for reducing vortex induced vibration, according to one or more embodiments described.

FIG. 5 depicts a schematic of another illustrative apparatus 500 for reducing vortex induced vibration, according to one or more embodiments. As described above with reference to the strake 100, the strake 500 can include an inner body 200, cover 110, and fins 150. The strake 500 can have a longitudinal gap or slot extending along the length of the strake 500. The gap or slot can enable the strake 500 to expand circumferentially to allow installation about a marine element (such as during placement on a pipe or riser). In one or more embodiments, the gap or slot can be made, for example, by rolling or bending a quadrilateral sheet of metal or other suitable material to form the inner body 200. In one or more embodiments, the gap or slot can be made by cutting one side of the assembled strake 500 along the length thereof.

Figure 6:
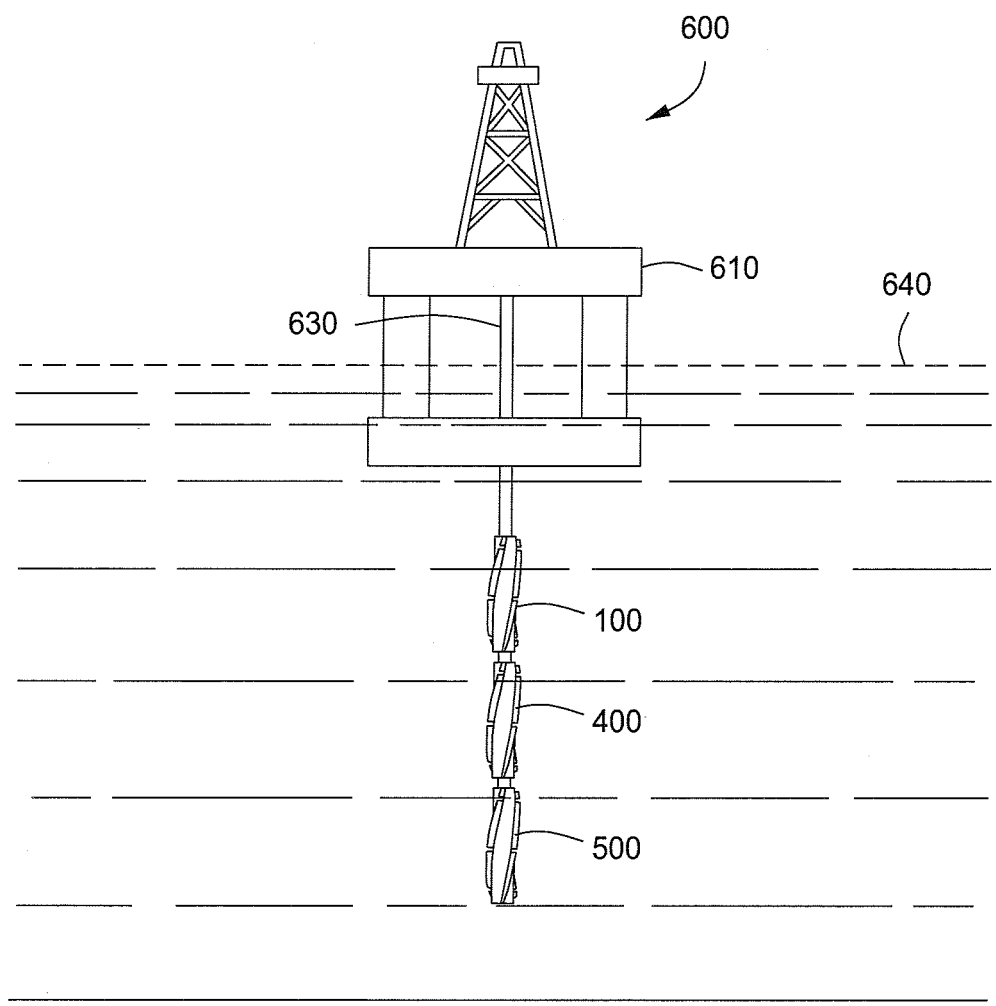
FIG. 6 depicts a schematic of an illustrative offshore operation having at least one marine element fitted with an apparatus for reducing vortex induced vibration, according to one or more embodiments described.

FIG. 6 depicts a schematic of an illustrative offshore operation 600 having at least one marine element fitted with an apparatus for reducing vortex induced vibration, according to one or more embodiments. The offshore operation 600 can include any oil and/or gas production platform 610, any number of marine elements 630 for drilling, production and/or workover operations, and any number of strakes 100, 400, and/or 500.

The term "marine element," as used herein, refers to any underwater tubular or conduit. Illustrative marine elements can include, but are not limited to, subsea pipelines; drilling import and export risers; tendons for tension leg platforms; anchoring lines; cables and other umbilical elements; legs for fixed and compliant platforms; and other elongated components used in offshore operations. The term "offshore," as used herein, refers to any type of aquatic environment, whether fresh, brackish, or salt water. The term "operation," as used herein, refers to any type of offshore operation, whether permanent, temporary or periodic, fixed or mobile.

Any one or more apparatus for reducing vortex induced vibration 100, 400, and/or 500 can be disposed on a marine element 630. As shown, two or more strakes 100, 400, 500 or combination of strakes 100, 400, and/or 500 can be installed in any order. The strakes 100, 400, 500 can be installed in contact with one another, i.e. end to end.

The strakes 100, 400, and/or 500 can also be disposed so that there is a space or distance therebetween. The distance between any two adjacent strakes 100, 400, and/or 500 can be the same or can vary. Various factors can determine the distance between two strakes 100, 400, and/or 500. Such factors can include, but are not limited to the size of the strake 100, 400, and/or 500, the current, the distance below the surface the strake 100, 400, and/or 500 is installed, and the angle or bend of the marine element 630. Suitable spacings between strakes 100, 400, 500 can be about 2.5 cm (1 in), or 5 cm (2 in, or 7.6 cm (3 in), to about 25 cm (10 in), 51 cm (20 in), or 194 cm (30 in). Although not shown, spacers, collars, or other devices can be disposed between adjoining strakes 100, 400, and/or 500 to maintain proper spacing.

In one or more embodiments, the one or more strakes 100, 400, and/or 500 can be installed on the marine elements 630 above the surface prior to installation into the water. In one or more embodiments, the strake 100, 400, 500 can be installed under the surface of the water 640 after the marine element 630 is in place. For example, one or more strakes 100, 400, and/or 500 can be installed on the marine element 630 by divers or submersible vehicles, such as remotely operated vehicles ("ROVs"). In one or more embodiments, one or more strakes 100, 400, 500 can be installed as the marine element 630 is lowered into the water from the platform 610.

In one or more embodiments, the one or more strakes 100, 400, and/or 500 can be installed as the marine element is assembled on a vessel (not shown). For example, when the marine element 630 includes several lengths of pipe joined or fitted together the strakes 100, 400, and/or 500 can be installed on a section of pipe making up the marine element 630 as the sections of pipe are fitted or otherwise joined together. Such method of installing strakes 100, 400, and/or 500 can utilize a vessel (not shown), usually called an S-lay, J-lay, or Reel-lay barge, that can have a specially designed declining ramp equipped with rollers that can be positioned along a side of the vessel and descend below the surface of the water 640. As the lengths of pipe are fitted together the strakes 100, 400, and/or 500 can be attached to the connected pipe sections before the pipe is rolled or slid down the ramp and into the water.

The one or more strakes 100, 400, and/or 500 can be installed and secured around at least a portion of the marine element 630 using metal bands, clips, screws, bolts and nuts, rivets, other fasteners, or any other know method of securing strakes. The strakes 100, 400, and/or 500 can be secured on the marine element 630 using Inconel 625 bands and clips. In one or more embodiments, the metal bands, clips, screws, bolts and nuts, rivets, other fasteners, and other devices for securing the strakes 100, 400, and/or 500 can be coated with or made from one or more antifouling agents.

Although depicted as a floating platform, the platform 610 can be of any type, including submersible, semi-submersible, or jackup. In one or more embodiments, the platform 610 can include any number of drilling, operating, and processing equipment (not shown) disposed thereon. Drilling, operating, and processing equipment are well known in the art and can include, for example, a drilling derrick, drilling deck, drill strings, drill risers, one or more cranes, a heliport, operation management facilities, and personnel housing. Although shown and described with reference to a platform 610, the strakes 100, 400, 500 are equally effective for use with marine elements 630 extending from a boat or other vessel, e.g. a drilling ship.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for reducing vortex induced vibration on a marine element, comprising:
    a first body disposed within a second body, wherein the first body is made of a material having a greater density than the second body; and
    one or more helical fins disposed on a least one of the first body and the second body,
    wherein the first body and the second body are configured to move from a closed position to an open position to receive a marine riser or marine umbilical, wherein opposing longitudinal edges of the first body and opposing longitudinal edges of the second body are spaced apart when in the open position.

2. The apparatus of claim 1 further comprising one or more marine antifouling agents disposed on, within, or about the first body, the second body, the one or more helical fins, or combinations thereof.

3. The apparatus of claim 1, wherein the first body is a tubular member having a bore formed therethrough.

4. The apparatus of claim 1, wherein the first body comprises two or more holes formed therethrough.

5. The apparatus of claim 1, wherein the first body comprises concrete or metal.

6. The apparatus of claim 1, wherein the second body comprises a polymeric material selected from the group consisting of polyurethane, polyethylene, polypropylene, polytetrafluoroethylene, vinyl ester resin, polyvinyl chloride, isophthalic polyester resin, phenolic, copolymers thereof, blends thereof, and combinations thereof.

7. The apparatus of claim 1, wherein the first body comprises a polymeric material impregnated with metal, concrete, asphalt, ceramic, rock, or any combination thereof.

8. The apparatus of claim 1, wherein the one or more helical fins are disposed on an outer surface of the second body.

9. The apparatus of claim 1, wherein the one or more helical fins are integrated with the second body.

10. The apparatus of claim 1, wherein the one or more helical fins are disposed on an outer surface of the first body.

11. The apparatus of claim 1, wherein the first body has an inner surface adapted to receive the marine riser.

12. The apparatus of claim 11, wherein the inner surface surrounds the marine riser.

13. The apparatus of claim 1, wherein the first body is made of a material having more weight per linear foot than the second body.

14. The apparatus of claim 1, wherein the first body is made of concrete, and the second body is made of polyurethane.

15. A method for reducing vortex induced vibration comprising:
   installing an apparatus about a marine riser or marine umbilical, the apparatus comprising:
   a first body disposed within a second body, wherein the second body covers the length of the first body, and wherein the first body comprises a material having a greater density than the second body; and
   one or more helical fins disposed on at least one of the first body and the second body,
   wherein the first body and the second body are configured to move from a closed position to an open position to receive the marine riser or marine umbilical, wherein opposing longitudinal edges of the first body and opposing longitudinal edges of the second body are spaced apart when in the open position.

16. The method of claim 15, wherein the apparatus further comprises one or more marine antifouling agents disposed on, within, or about the first body, the second body, the one or more helical fins, or combinations thereof.

17. The method of claim 15, further comprising securing the apparatus about the marine riser or marine umbilical.

18. The method of claim 17, wherein securing the apparatus comprises one or more bands and clips.

19. The method of claim 15, wherein the first body comprises concrete or metal.

20. The method of claim 15, wherein the second body comprises a polymeric material selected from the group consisting of polyurethane, polyethylene, polypropylene, polytetrafluoroethylene, vinyl ester resin, polyvinyl chloride, isophthalic polyester resin, phenolic, copolymers thereof, blends thereof, and combinations thereof.

21. The apparatus of claim 15, wherein the first body is made of a material having more weight per linear foot than the second body.

22. An apparatus for reducing vortex induced vibration on a marine element, comprising:
   a first body at least partially disposed within a second body, wherein the first body is made of a material having a greater density than the second body; and
   one or more helical fins disposed on at least one of the first body and the second body,
   wherein the first body and the second body are configured to move from a closed position to an open position to receive the marine element, wherein the first body comprises at least two opposing longitudinal sections, and wherein the marine element is positioned between the two opposing longitudinal sections when the first body is in the closed position.

23. The apparatus of claim 22, wherein the marine element comprises at least one of an underwater tubular, an underwater conduit, a subsea pipeline, a drilling import riser, a drilling export riser, a tendon for a tension leg platform, an anchoring line, a cable, a leg for a fixed platform, and a leg for a compliant platform.

24. The apparatus of claim 22, wherein the axial length of the first body is between about 0.15 meters and about 2.4 meters.

25. The apparatus of claim 22, further comprising one or more marine antifouling agents disposed on, within, or about the first body, the second body, the one or more helical fins, or combinations thereof.

26. The apparatus of claim 22, wherein the first body comprises two or more holes formed therethrough.

27. The apparatus of claim 22, wherein the first body is made of a material having more weight per linear foot than the second body.

28. An apparatus for reducing vortex induced vibration on a marine element, comprising:
   a first body disposed within a second body, wherein the second body covers the length of the first body, and wherein the first body is made of a material having a greater density than the second body; and
   one or more helical fins disposed on a least one of the first body and the second body, wherein the first body is adapted to receive a marine riser or marine umbilical, wherein the first body comprises two or more holes formed therethrough, and wherein a portion of the second body is disposed through at least one of the two or more holes through the first body such that the portion of the second body disposed through the at least one of the two or more holes contacts an inner surface of the first body.

29. An apparatus for reducing vortex induced vibration on a marine element, comprising:
   a first body disposed within a second body, wherein the first body is made of a material having a greater density than the second body; and
   one or more helical fins disposed on at least one of the first body and the second body,
   wherein the first body and the second body are configured to move from a closed position to an open position to receive a marine element, wherein the first body and the second body each include a longitudinal slot through which the marine element is configured to pass when the first body and the second body are in the open position.

30. The apparatus of claim 29, wherein the marine element comprises at least one of an underwater tubular, an underwater conduit, a subsea pipeline, a drilling import riser, a drilling export riser, a tendon for a tension leg platform, an anchoring line, a cable, a leg for a fixed platform, and a leg for a compliant platform.

31. The apparatus of claim 29, further comprising one or more marine antifouling agents disposed on, within, or about the first body, the second body, the one or more helical fins, or combinations thereof.

32. The apparatus of claim 29, wherein the first body comprises concrete; metal; a polymeric material impregnated with at least one of metal, concrete, asphalt, ceramic, and rock; or any combination thereof; and the second body comprises a polymeric material selected from the group consisting of polyurethane, polyethylene, polypropylene, polytetrafluoroethylene, vinyl ester resin, polyvinyl chloride, isophthalic polyester resin, phenolic, copolymers thereof, blends thereof, and combinations thereof.

* * * * *